United States Patent
Hanton

(10) Patent No.: US 6,911,633 B2
(45) Date of Patent: Jun. 28, 2005

(54) SUSPENDED INDUCTION COIL AND METHOD FOR REPLACEMENT OF TURNS COMPRISING SAME

(75) Inventor: David J. Hanton, Vienna, OH (US)

(73) Assignee: Ajax Magnethermic Corporation, Warren, OH (US)

( * ) Notice: Subject to any disclaimer, the term of this patent is extended or adjusted under 35 U.S.C. 154(b) by 0 days.

(21) Appl. No.: 09/893,826

(22) Filed: Jun. 28, 2001

(65) Prior Publication Data

US 2003/0000946 A1 Jan. 2, 2003

(51) Int. Cl.⁷ ................................................ H05B 6/36
(52) U.S. Cl. ...................................... 219/672; 219/635
(58) Field of Search .............................. 219/672, 636, 219/635, 637, 676; 373/153

(56) References Cited

U.S. PATENT DOCUMENTS

| | | |
|---|---|---|
| 2,372,946 A | 4/1945 | Foster et al. |
| 3,385,946 A | 5/1968 | Hatchard |
| 3,715,556 A | 2/1973 | Blazer et al. |
| 4,577,081 A | 3/1986 | Blazer |
| 4,649,249 A * | 3/1987 | Odor .......................... 219/659 |
| 5,074,458 A | 12/1991 | Tanaka et al. |
| 5,410,132 A * | 4/1995 | Gregg et al. ................. 219/604 |
| 5,683,608 A | 11/1997 | Matsen et al. |
| 5,793,024 A | 8/1998 | Matsen et al. |
| 5,889,813 A * | 3/1999 | Fujita et al. ................. 373/156 |
| 6,040,563 A | 3/2000 | Matsen et al. |
| 6,198,083 B1 * | 3/2001 | Pierman ..................... 219/636 |

* cited by examiner

Primary Examiner—Teresa Walberg
Assistant Examiner—Quang Van
(74) Attorney, Agent, or Firm—Fay, Sharpe, Fagan, Minnich & McKee, LLP

(57) ABSTRACT

An induction heater (14) for use in conjunction with an associated furnace (10) for material processing includes essentially straight induction coil (16, 50) arranged inside the furnace shell (12). The induction coil (16, 50) has an attachment end (32, 54) extending outside of the furnace shell through a first opening (40) therein. A replacement induction coil (54R) is selectively connected with the attachment end (32, 54) of the induction coil (16, 50) and slidably inserted into the furnace shell (12) whereby the essentially straight induction coil (16, 50) is simultaneously slidably pushed out of the furnace shell (12) through a second opening therein.

19 Claims, 6 Drawing Sheets

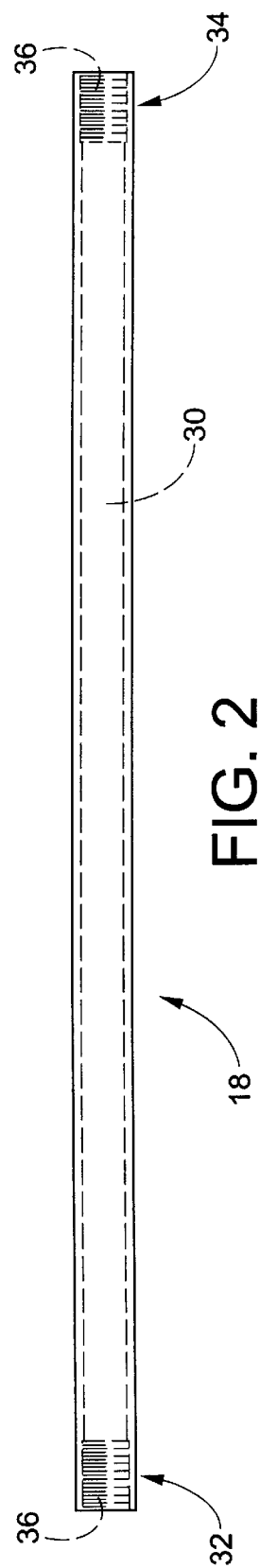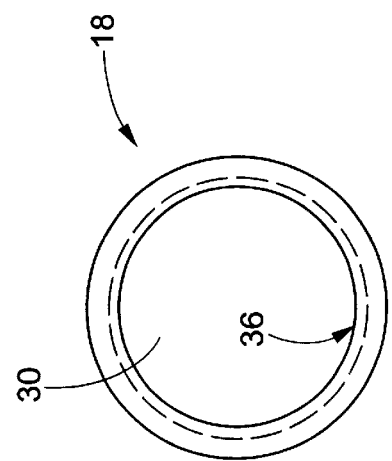

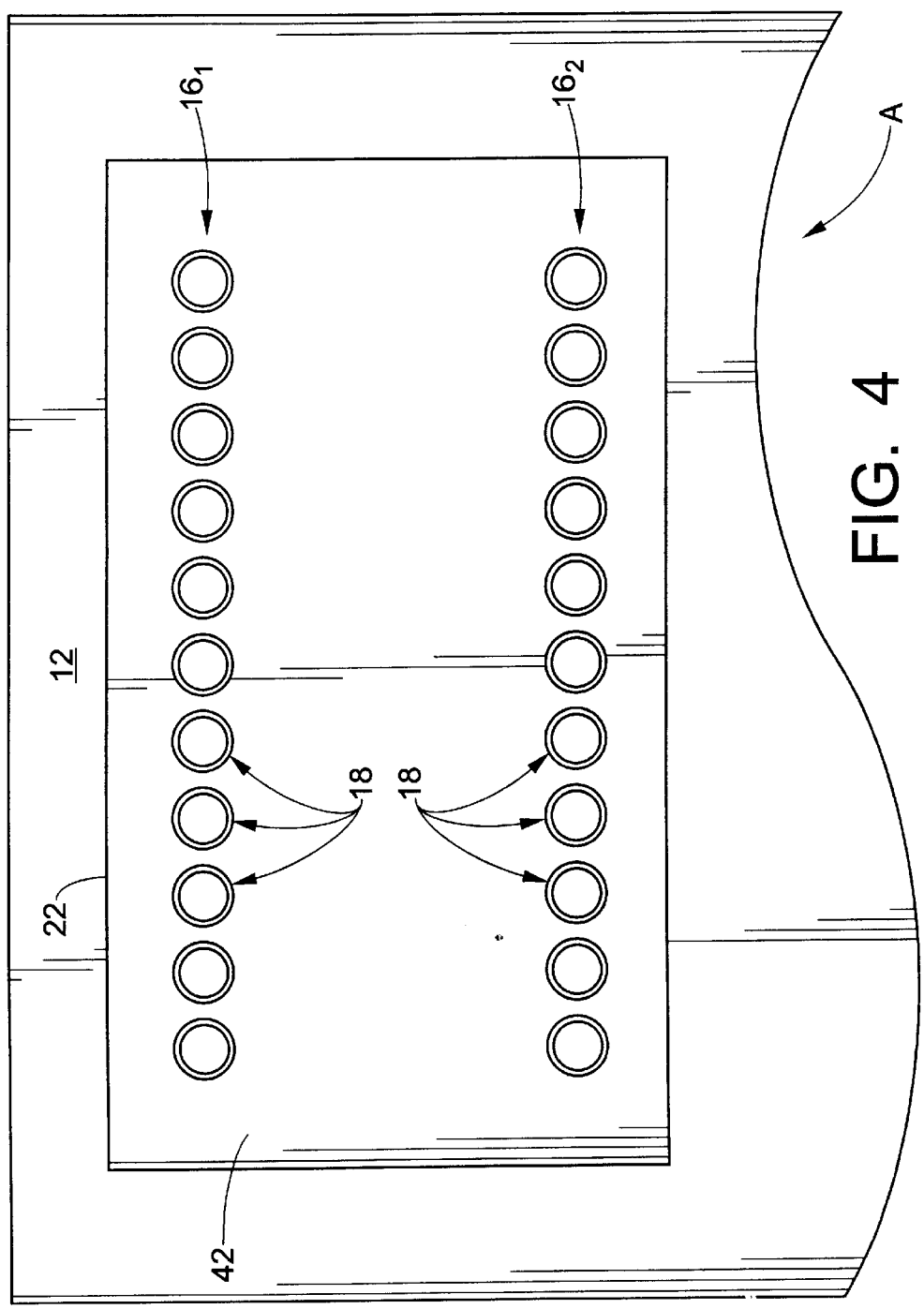

SUSPENDED INDUCTION COIL AND METHOD FOR REPLACEMENT OF TURNS COMPRISING SAME

BACKGROUND OF THE INVENTION

The present invention relates to the material processing arts. It particularly relates to the coating or annealing of metal strips, such as carbon steel strips, in a controlled atmosphere using combustion furnace heating augmented by induction heating, and will be described with particular reference thereto. However, the invention will also find application in other material manufacturing and surface treatment processes that take place in a chamber inside which induction heating coils are advantageously disposed for controlled heating.

Many steel processing steps such as annealing, coating, galvannealing, and the like require thermal cycling of the subject steel, which steel is typically in the form of a strip, bar, tube, pipe, or other shape. The prior art includes combustion furnaces with augmentation by induction heating to effectuate the proper thermal cycle. Augmentation by induction heating increases furnace capacity.

In order to be effective, the induction heating coils should closely coupled to the subject material, and preferably to the subject metal. However, the coils are typically disposed outside the furnace. This arrangement reduces inductive energy transfer to the steel due to the spatial separation. Improved coupling can be obtained by modifying the shape of the furnace shell, e.g. by necking down the furnace in the vicinity of the induction coils.

Alternatively, the coils can be placed inside the furnace. This arrangement has the advantage of close coupling between the coils and the steel strip or bar. However, placing the coils inside the furnace increases the likelihood of coil damage and failure due to impingement upon the closest structure in the confined interior space. Furthermore, the prior art methods for replacement of coils disposed inside the furnace typically involve a complete shutdown of furnace operations and removal of the damaged coil or coils, using a crane or other heavy machinery to access the furnace interior and remove the entire induction coil.

Generally, the root cause of failure in a furnace employing induction heating is impingement by the steel strip on the closest structure. In the case of induction coils arranged outside the furnace, this corresponds to impingement of the strip on the insulation at the necked-down region of the furnace. This insulation is preferably thin to improve heater coupling with the steel strip or bar. However, the insulation is also preferably thick enough to ensure adequate furnace insulation. Furthermore, the insulation should be as far away as possible from the strip to avoid contact therewith. Thus, compromises are made with respect to the insulation thickness and the size of the furnace opening in the necked-down region, and these compromises in turn limit the size of the steel strip or bar that can be accommodated by the furnace.

External placement of the coils advantageously enables coil replacement without shutting down the furnace. However, in this arrangement the closest structure to the strip is the insulation rather than the coil, and so insulation failure is more likely than coil failure. Insulation repair or replacement usually cannot be performed without a complete furnace shutdown.

Locating the coil inside the furnace eliminates the need for necking-down the furnace shell and improves inductive coupling with the steel strip. However, with this arrangement the coils are the closest structure to the steel strip, and therefore the coils are the most likely element to fail. The coils can be encased in a refractory material to reduce the probability of damage thereto. However, the refractory introduces the disadvantages of less efficient coupling due to the intervening refractory material, and larger coil size. The increased coil size due to the additional refractory coating is particularly disadvantageous due to the limited space available inside the furnace. Also, in the event that the strip contacts the refractory material, contamination of the steel strip becomes a major quality issue. In the case of coil or refractory failure, the furnace usually must be completely shut down and the entire coil removed.

Locating a bare coil inside the furnace enables the maximum electrical efficiency along with the maximum trip movement without contact with any structures, e.g. the coils. However, coil repair of such prior art induction heating systems again typically involves a complete furnace shutdown and removal of the entire coil using a crane or other heavy machinery.

The present invention contemplates an improved induction coil which overcomes the aforementioned limitations and others.

SUMMARY OF THE INVENTION

According to one aspect of the invention, an induction heater coil is disclosed for use in conjunction with an associated furnace for material processing, said furnace including at least a furnace shell. At least one essentially straight induction coil turn is arranged inside the furnace shell. The induction coil turn has an attachment end extending outside of the furnace shell through a first opening therein wherein a replacement induction coil is selectively connected with the essentially straight induction coil and slidably inserted into the furnace shell. The slidable insertion of the replacement coil turn simultaneously slidably pushes out the essentially straight induction coil turn through a second opening therein.

Preferably, a seal is disposed between the essentially straight induction coil turn and the first opening in furnace shell. The seal supports the essentially straight induction coil turn in the furnace and essentially seals the interface between the essentially straight induction coil turn and the furnace shell opening against substantial leakage of a gas contained within the furnace.

Preferably, an insulating material is disposed between the essentially straight induction coil turn and the first opening in the furnace shell. The insulating material supports the essentially straight induction coil turn in the furnace. The insulating material preferably includes a calcium silicate board.

Preferably, the attachment end includes a threading arranged on an end of the essentially straight induction coil turn. The connection of the replacement induction coil turn can include an interconnecting element having a first threading that mates with the threading arranged on an end of the induction coil turn. The connection of the replacement induction coil turn to the essentially straight induction coil turn preferably further includes an attachment end of the replacement induction coil turn that has a threading arranged on an end of the replacement induction coil turn that mates with a second threading of the interconnecting element. In a preferred embodiment of the interconnecting element, the first threading and the second threading of the interconnecting element constitute a single threading.

The induction coil can include a plurality of coil turns arranged in the furnace shell to essentially conform with a catenary of an essentially horizontally oriented strip of material under processing by the furnace.

The essentially straight induction coil turn preferably further includes a hollow portion through which water cooling is selectively flowed.

The essentially straight induction coil turn optionally further includes a refractory ceramic coating disposed on at least a portion of the outer surface thereof.

According to another aspect of the invention, a method is disclosed for replacing an induction coil turn arranged inside a furnace. A replacement induction coil turn is connected to the induction coil turn at an end of the induction coil turn that extends beyond a shell of the furnace. The connecting forms a replacement induction coil turn-induction coil turn assembly. The replacement induction coil turn-induction coil turn assembly is slidably moved, thereby sliding the induction coil turn out of the furnace while simultaneously sliding the replacement induction coil turn into the furnace. The induction coil turn is disconnected from the replacement induction coil turn.

Preferably, during the sliding step, a sealing of an interface between the replacement induction coil turn-induction coil turn assembly and the furnace is obtained, that substantially reduces leakage of a gas contained within the furnace. The sealing preferably further includes sealing the interface with an insulating material that additionally supports the replacement induction coil turn-induction coil turn assembly.

The step of connecting a replacement induction coil turn to the induction coil turn preferably includes the steps of attaching a first end of an interconnecting element onto the induction coil turn, and attaching a second end of the interconnecting element onto the replacement coil turn.

Preferably, the step of connecting a replacement induction coil turn to the induction coil turn includes the steps of threadedly attaching a first end of a threaded linear element onto the induction coil turn, and threadedly attaching the replacement coil turn onto a second end of the threaded linear element.

The method preferably further includes reducing, at least during the sliding step, a pressure inside the furnace below an operating pressure thereby reducing leakage of a gas contained within the furnace during the sliding.

The method preferably further comprises continually operating an auxiliary heating system and thereby maintaining the furnace at a preselected temperature at least during the connecting, sliding, and disconnecting steps.

The method preferably further comprises continuously operating a combustion heater associated with the furnace during at least the connecting, sliding, and disconnecting steps.

According to yet another aspect of the invention, a method is disclosed for replacing an essentially linear element disposed in a furnace. The element has a first end extending outside the furnace through a first furnace opening, and a second end aligned with a second furnace opening. A replacement essentially linear element is detachably attached to the first end of the essentially linear element. The attaching producing an essentially linear assembly of the replacement element and the element. The assembly of the replacement element and the element is slidably moved to effectuate an ejecting of the element through the second furnace opening and an insertion of the replacement element in place of the element. The element is detached from the replacement element.

Preferably, the step of detachably attaching includes the steps of attaching an interconnecting element to the first end of the element and attaching the interconnecting element to an end of the replacement element, while the step of detaching the element from the replacement element includes the step of detaching the interconnecting element from the replacement element.

One advantage of the present invention is that it permits replacement of damaged induction coil turns without a complete shutdown of furnace operations.

Another advantage of the present invention is that it enables replacement of induction coil turns arranged inside a furnace without the use of a crane or other heavy machinery.

Yet another advantage of the present invention is that, once the power ports are in place, the entire induction coil can be assembled on-site.

Still yet another advantage of the present invention is that an induction coil can be constructed to follow the expected strip catenary on a horizontal application in an easy way, whereby the likelihood of impingement between the strip and the coil is reduced.

Still further advantages and benefits of the present invention will become apparent to those of ordinary skill in the art upon reading the following detailed description of the preferred embodiment.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

FIG. 2 is a side view of an induction coil turn in accordance with a preferred embodiment of the invention;

FIG. 3 is an enlarged end view of the induction coil turn of FIG. 2;

FIG. 4 shows an enlarged view looking in the direction A as indicated on FIG. 1, with the electrical and coolant connections removed.

DETAILED DESCRIPTION OF THE PREFERRED EMBODIMENTS

Figure 1:
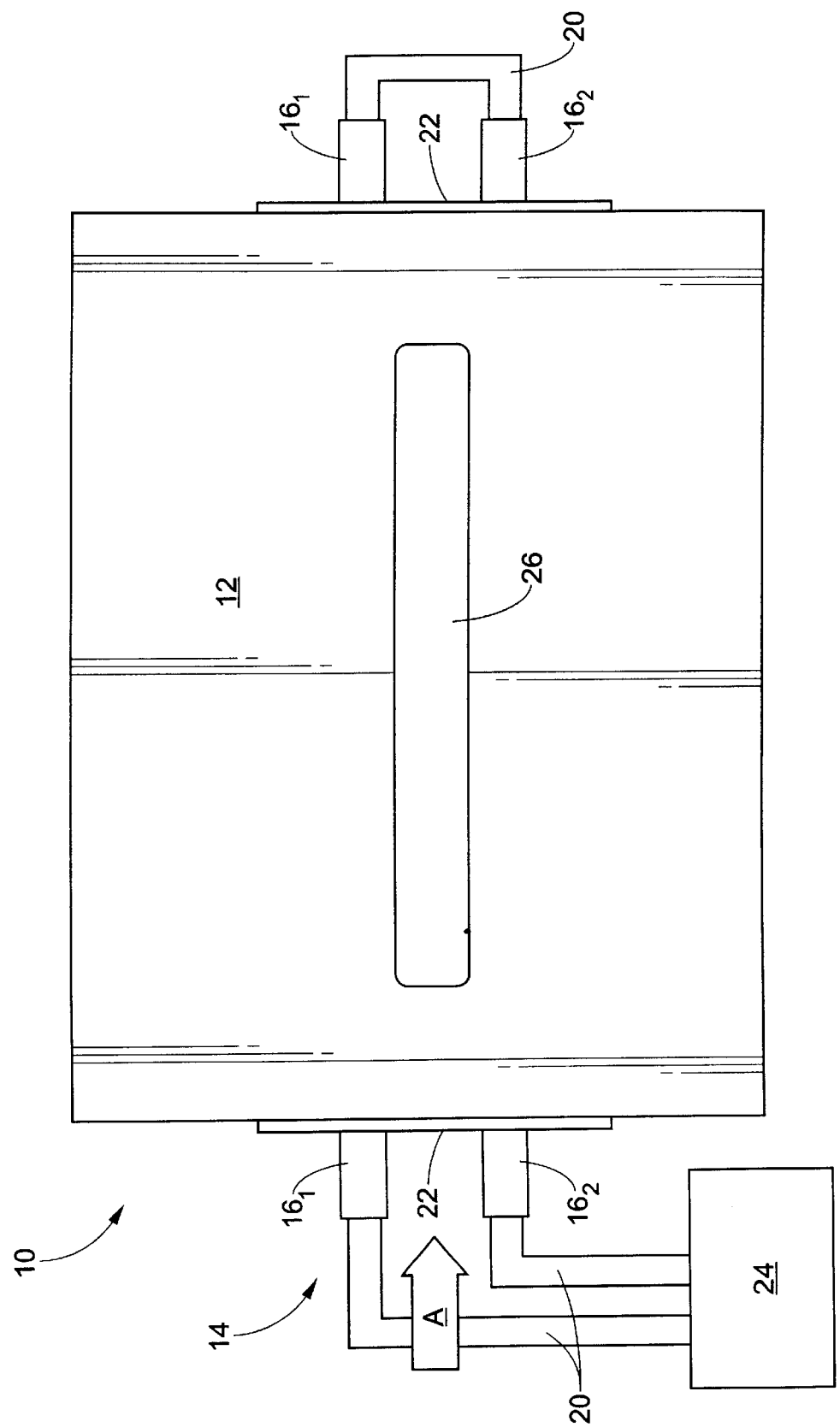
FIG. 1 is a diagrammatic representation of an exemplary furnace having an induction heater formed in accordance with a preferred embodiment of the invention.

With reference to FIGS. 1–4, a preferred embodiment of a furnace 10 having an induction heater formed in accordance with a preferred embodiment of the invention is described. The furnace 10 includes a furnace shell 12, and an induction heater 14. The induction heater 14 preferably includes a plurality of induction coils 16, in FIG. 1 two induction coils $16_1$, $16_2$. Each induction coil 16 includes a plurality of coil turns 18, as best seen in FIG. 4 which shows an enlarged view of the turns 18 that make up the two induction coils $16_1$ $16_2$ viewed in the direction A as indicated on FIG. 1 after removal of electrical lead lines 20. In the exemplary FIG. 4, each induction coil $16_1$, $16_2$ includes eleven coil turns 18. Each coil turn 18 is essentially straight and passes through the furnace shell 12 so that only the ends of the induction coil turn 18 protrude from sides of the furnace shell as shown in FIG. 1.

The induction heater 14 additionally preferably includes water cooled lead lines 20 that provide electrical power to the induction coils $15_1$, $16_2$ and preferably operatively connect with the induction coil turns 18 in any conventional manner, e.g. by a threaded connection. The coils $16_1$, $16_2$ are typically disposed in power ports 22 that are cut out of the furnace shell 12. An a.c. electrical induction power supply 24 provides electrical power for the induction heater 14 via the water cooled lead lines 20, and is also preferably of a conventional type known to the art. Typically, the ends of the coil turns of a coil $16_1$, $16_2$ opposite the side where the electrical power is applied are connected by copper water cooled electrical conductors or the like (not shown) to reduce resistive losses.

The furnace 10 can be adapted to perform thermal annealing, surface coating, galvannealing, and other materials processing that require a thermal cycling of the subject material. In a typical arrangement, the subject material is a steel strip (not shown) that passes through the furnace 10 in continuous fashion through openings 26 in opposite sides of the furnace shell 12. The rows of furnace coils $16_1$, $16_2$ are preferably arranged in close proximity on either side of the strip for efficient inductive coupling therewith. The furnace optionally includes numerous additional features known to the art which are not shown here, such as gas inlets to admit nitrogen or other process gases, valving for controlling the ambient pressure in the furnace, and mechanical means for loading, transporting, and removing the subject material, e.g. strip, pipe, etc. The furnace also preferably includes an auxiliary heating means (not shown) such as a combustion heater, which operates in conjunction with the induction heater 14 to effect the desired thermal cycle.

With particular reference now to FIGS. 2 and 3, each induction coil turn 18 is essentially straight and preferably cylindrical in cross-section, although square or other cross-sectional shapes are also contemplated. Preferably, the coil turns 18 includes a coolant fluid conduit 30 which in FIG. 3 is a hollow opening 30 that runs the length of the turn 18. The coil turn 18 also preferably includes first and second ends 32, 34 that are adapted to receive an attachment to be used during the oil turn replacement process described later.

In FIGS. 2 and 3, the turn ends 32, 34 include inside (ID) threading 36 for receiving an attachment. The ends 32, 34 are preferably essentially identical to provide symmetry for the coil turn 18, although such symmetry is not a requirement of the invention. Preferably, the attachment threadings 36 that provide attachment means for attaching a replacement coil turn during the coil turn replacement process (to be described later) additionally serve as the connecting means for connecting the lead lines 20. The preferred embodiment thus provides an exceptionally simple and easily manufactured coil turn design. However, variations such as separate connecting means for the coil turn replacement and the lead lines 20 are also contemplated.

The coil turns 18 are preferably comprised of a copper alloy that provides mechanical strength, excellent electrical conductivity, and excellent thermal stability. The turns 18 are preferably uncoated, i.e. bare coil turns. However, various coatings, such as a ceramic refractory coating (not shown), are also contemplated.

With continuing reference to FIGS. 1–4, the positioning of the induction coil turns 18 in the furnace shell 12 is now described in greater detail. The furnace shell 12 (only a portion of which is shown in FIG. 4) preferably includes a first power port 22 through which first ends 32 of the induction coils 18 protrude. The second power port of FIG. 1 is preferably essentially similar to the first power port shown in FIG. 4, and the two power ports 22 are disposed at opposite ends of the furnace shell 12 for receiving the first and second ends 32, 34 of the coil turns 18 so that each coil turn 18 is suspended within the furnace shell 12 and is supported therein through the furnace shell 12 near the two opposite coil ends 32, 34.

In order to electrically and thermally isolate the coil turns 18 from each other and from the furnace shell 12, an insulating material 42 is preferably arranged in the first power port 22 so as to surround the first ends 32 of the induction coil turns 18. In a preferred embodiment, the insulating material 42 is a calcium silicate board approximately 5 cm thick that provides both the thermal and the electrical insulation. The first ends 32 of the coil turns 18 are arranged in holes formed in the calcium silicate board. A similar arrangement is provided at the second power port so that the coil turns 18 are supported near the first and second ends 32, 34 by the calcium silicate boards disposed in the power ports 22. Preferably, the insulation 42 essentially fills the space between the coil turns 18 and the edges of the power port 22 openings. The insulating material 42 preferably cooperates with the power port 22 openings to support and hold the coil turns 18 without shifting or other substantial displacement of the coil turns 18 over time.

It will be appreciated that separate electrically insulating and thermally insulating materials (not shown) can be substituted for the combination insulation 42 shown in FIG. 4. Similarly, additional insulation (electrical, thermal or both) can be optionally included along with the calcium silicate insulating board to provide additional isolation. It is also to be appreciated that in the case of a furnace having a nitrogen gas or other controlled ambient atmosphere that is preferably maintained at a process-specific pressure, the insulating material 42 advantageously provides sealing of the power port 22 opening against excessive leakage of the process gas.

It is again emphasized that an arrangement essentially similar to the arrangement shown in FIG. 4 for the first power port 22 is preferably also disposed at an opposite end of the furnace shell 12, i.e. at the second power port to provide support, electrical and thermal isolation, and optional sealing for the second ends 34 of the coil turns 18 which also preferably protrude beyond the furnace shell 12 as shown in FIG. 1.

With particular reference now to FIG. 4, the induction coil turns 18 that make up the induction coils $16_1$, $16_2$ are shown in essentially straight rows. However, in the case of induction coils for use in a furnace that processes a strip of material in a horizontal position, the induction coils optionally include a curvature (not shown) of the rows of coil turns 18 that essentially matches the expected strip catenary.

Figure 5A:
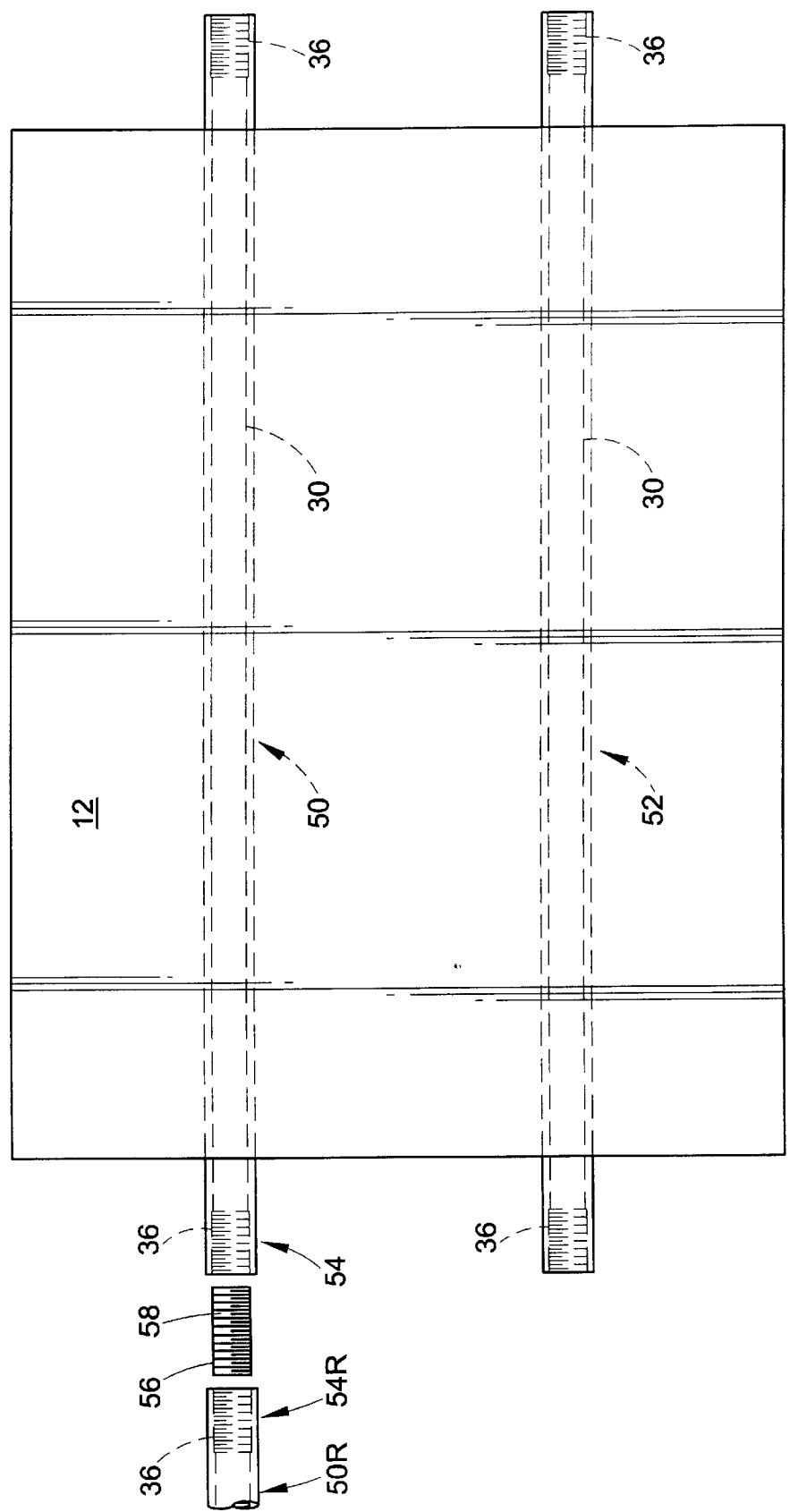
FIGS. 5A–5C are a diagrammatic representation of the method for replacing an induction coil turn formed in accordance with a preferred embodiment of the invention.
Figure 5B:
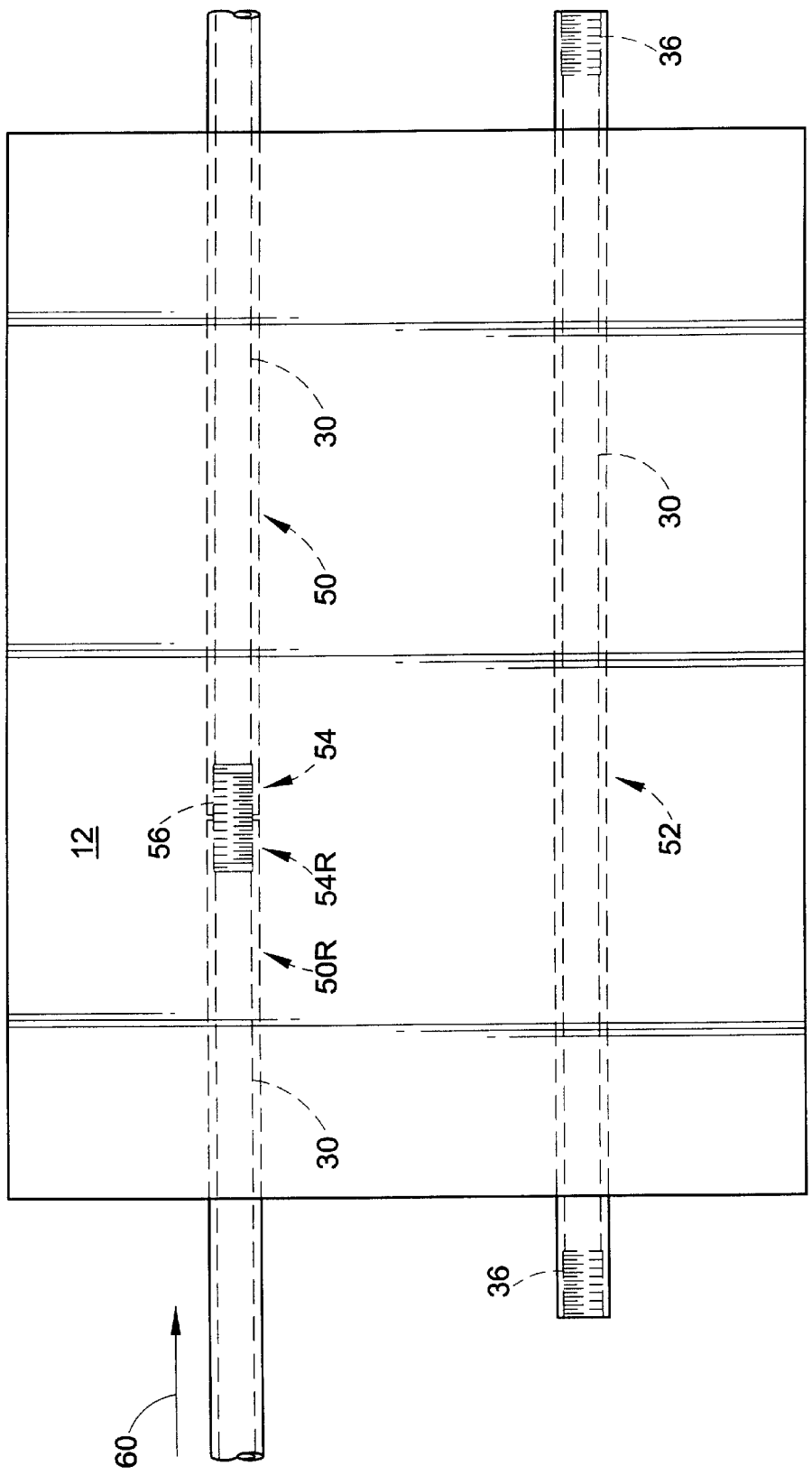
Figure 5C:
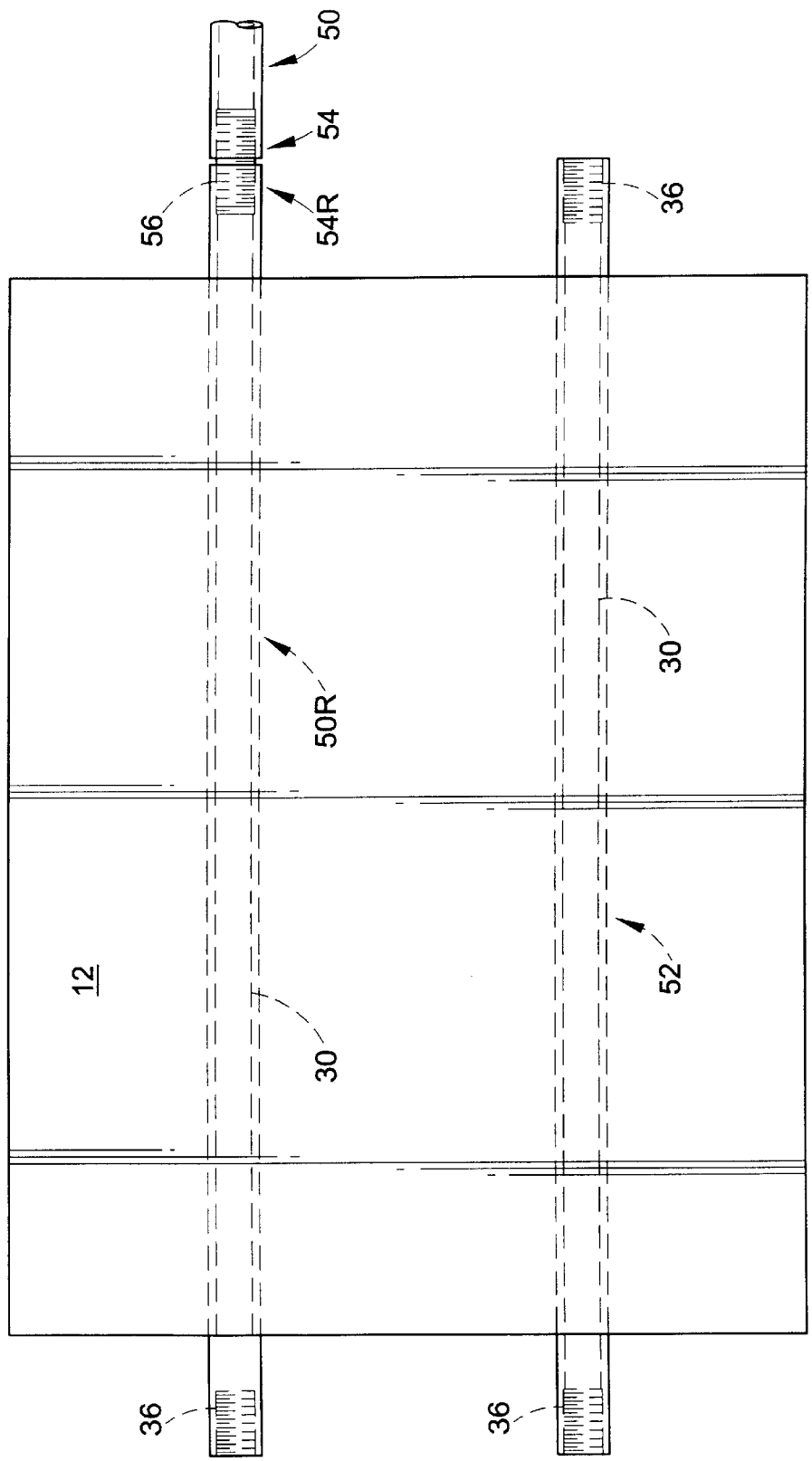

With reference now to FIGS. 5A, 5B, and 5C, a method for replacing an induction coil turn 18 performed in accordance with a preferred embodiment of the invention is described. Starting with FIG. 5A, two induction coil turns 50 and 52 are shown. The coil turn 50 is to be replaced by a replacement coil turn 50R, only a portion near an end 54R of which is shown in FIG. 5A. Coil turn replacement is typically done in response to the coil turn 50 being damaged by impingement with the processed material or in response to another failure of the coil turn 50. Coil turn replacement can also be performed for other reasons, of course, such as during an upgrade of the induction heater 14. Coil turns other than the coil turn 50, e.g. the coil turn 52, advantageously remain essentially undisturbed during the replacement process.

Prior to the point in time shown in FIG. 5A, the water cooled electrical lead lines 20 are removed (step not shown), so that the view looking in the direction A (FIG. 1) shown in FIG. 4 is obtained. In a first step of the coil turn replacement process, the replacement coil turn 50R is aligned with the coil turn 50 which is positioned in the furnace shell 12. This aligning can be performed manually, or the aligning can involve a crane or other machinery. In a preferred embodiment using copper alloy coil turns about 5 cm in diameter and about 3.3 meters long, manual aligning has been found to be satisfactory, so that additional machinery is not required.

In a second step, the end 54R of the replacement coil turn 50R is detachably attached to an end 54 of the coil turn 50 to form an essentially rigid and essentially linear assembly comprising the replacement coil turn 50R and the coil turn 50. Preferably, the detachable attaching is by an interconnecting element 56, which in the preferred embodiment is a threaded linear element, for example a stud with outside (OD) threading 58 that mates with inside (ID) threadings 36 on the ends 54 and 54R. However, other interconnecting elements are also contemplated, as well as a direct connection, e.g. by mating threads (not shown) on the ends 54 and 54R whereby the interconnecting element 56 is dispensed with. The detachable attaching of the ends 54, 54R should preferably produce an essentially smooth profile across the connection that is unlikely to snag or catch the insulation 42 during the sliding step to be described next.

Once the assembly is formed, with reference to FIG. 5B the replacement coil turn 50R is pushed into the furnace shell 12 in the direction indicated by the force arrow 60 as shown in FIG. 5B. Preferably, the insulation 42 and the corresponding insulation at the opposite end of the furnace shell 12 provides a sufficiently loose binding of the coil turn 50 to enable a sliding movement of the coil turn 50 under the influence of the force 60 that is transmitted through the replacement coil turn 50R to the coil turn 50 through the interconnecting element 56. This sliding step continues, so that the replacement coil turn 5OR slides into the furnace shell 12 while simultaneously the coil turn 50 slides out of the furnace shell 12 as shown in FIG. 5B.

At the point in time illustrated in FIG. 5C, the coil turn 50 is fully ejected from the furnace shell 12 and the replacement coil turn 50R has taken its place. At this point the detachable attachment is detached, e.g. by unscrewing the interconnecting element 56 from the end 54R of the replacement coil turn 50R (step not shown), the electrical connections are re-established, and the induction heater 14 is again operable.

It is to be appreciated that the furnace 10 need not be shut down during the coil turn replacement steps illustrated in FIGS. 5A–5C. The induction heater 14 does have to be shut down. However, any auxiliary heating systems, such as a combustion heater, preferably remain fully functional and typically can be operated throughout the coil turn replacement process to maintain the furnace at a desired temperature. Similarly, process gases optionally continue to flow during the coil turn replacement process. However, because the sealing quality of the insulation 42 around the assembly of the coil turn 50 and the replacement coil turn 50R may be reduced due to the sliding motion, the pressure in the furnace is optionally reduced below the normal operating pressure during the coil turn replacement process to reduce leakage of process gas.

A preferred embodiment of the apparatus and process has been described with reference to FIGS. 1–5C, relating to a suspended induction coil turn and a method for replacing the same. However, it is to be appreciated that the invention will also find application in conjunction with other essentially linear elements that are suspended within a furnace in like manner. For example, the invention will find application in conjunction with robber rings for induction heaters, guide bars, and the like.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An induction heater coil for use in conjunction with an associated furnace for material processing, said furnace including a furnace shell, the induction heater coil comprising:

at least one essentially straight induction coil turn arranged inside the furnace shell, said induction coil turn having an attachment end extending outside of the furnace shell through a first opening therein wherein a replacement induction coil is selectively connected with the essentially straight induction coil and slidably inserted into the furnace shell whereby the essentially straight induction coil is simultaneously slidably pushed out of the furnace shell through a second opening therein.

2. The induction heater coil as set forth in claim 1, further comprising:

a seal disposed between the essentially straight induction coil turn and the first opening in the furnace shell, said seal supporting the essentially straight induction coil turn in the furnace and essentially sealing the interface between the essentially straight induction coil turn and the first furnace shell opening against substantial leakage of a gas contained within the furnace.

3. The induction heater coil as set forth in claim 1, further comprising an insulating material disposed between the essentially straight induction coil turn and the first opening in the furnace shell, said insulating material supporting the essentially straight induction coil turn in the furnace.

4. The induction heater coil as set forth in claim 3, wherein the insulating material includes a calcium silicate board.

5. The induction heater coil as set forth in claim 1, wherein the attachment end comprises a threading arranged on an end of the essentially straight induction coil turn.

6. The induction heater coil as set forth in claim 5, wherein the connection of the replacement induction coil turn includes an interconnecting element having a first threading that mates with the threading arranged on an end of the induction coil turn.

7. The induction heater coil as set forth in claim 6, wherein the connection of the replacement induction coil turn to the essentially straight induction coil turn further comprises:

an attachment end of the replacement induction coil turn that includes a threading arranged on an end of the replacement induction coil turn that mates with a second threading of the interconnecting element.

8. The induction heater coil as set forth in claim 7, wherein the first threading of the interconnecting element and the second threading of the interconnecting element constitute a single threading.

9. The induction heater coil as set forth in claim 1, wherein:

the induction coil includes a plurality of coil turns arranged in the furnace shell to essentially conform with a catenary of an essentially horizontally oriented strip of material under processing by the furnace.

10. The induction heater coil as set forth in claim 1, wherein the essentially straight induction coil turn further includes a hollow portion through which water cooling is selectively flowed.

11. The induction heater coil as set forth in claim 1, wherein the essentially straight induction coil turn further includes a refractory ceramic coating disposed on at least a portion of the outer surface thereof.

12. A method for replacing an induction coil turn arranged inside a furnace, comprising the steps of:
   connecting a replacement induction coil turn to the induction coil turn at an end of the induction coil turn that extends beyond a shell of the furnace and thereby forming a replacement induction coil turn-induction coil turn assembly;
   sliding the replacement induction coil turn-induction coil turn assembly and thereby sliding the induction coil turn out of the furnace while simultaneously sliding the replacement induction coil turn into the furnace; and
   disconnecting the induction coil turn from the replacement induction coil turn.

13. The method according to claim 12 further comprising, during the sliding step, sealing an interface between the replacement induction coil turn-induction coil turn assembly and the furnace and thereby substantially reducing leakage of a gas contained within the furnace.

14. The method according to claim 13 wherein the sealing step further comprises sealing the interface with an insulating material that additionally supports the replacement induction coil turn-induction coil turn assembly.

15. The method according to claim 12 wherein the step of connecting the replacement induction coil turn to the induction coil turn includes the steps of:
   attaching a first end of an interconnecting element onto the induction coil turn; and
   attaching a second end of the interconnecting element onto the replacement coil turn.

16. The method according to claim 12 wherein the step of connecting the replacement induction coil turn to the induction coil turn includes the steps of:
   threadedly attaching a first end of a threaded linear element onto the induction coil turn; and
   threadedly attaching the replacement coil turn onto a second end of the threaded linear element.

17. The method according to claim 12 further comprising reducing, at least during the sliding step, a pressure inside the furnace below an operating pressure thereby reducing leakage of a gas contained within the furnace during the sliding.

18. The method according to claim 12 further comprising continually operating an auxiliary heating system and thereby maintaining the furnace at a preselected temperature at least during the connecting, sliding, and disconnecting steps.

19. The method according to claim 12 further comprising continuously operating a combustion heater associated with the furnace during at least the connecting, sliding, and disconnecting steps.

* * * * *